United States Patent
Natarajan et al.

(10) Patent No.: US 7,145,877 B2
(45) Date of Patent: Dec. 5, 2006

(54) APPARATUS AND METHOD FOR DISTANCE EXTENSION OF FIBRE-CHANNEL OVER TRANSPORT

(75) Inventors: Sriram Natarajan, Sunnyvale, CA (US); Sharat Prasad, San Jose, CA (US); Yu Deng, Milpitas, CA (US); Yanfeng Wang, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 111 days.

(21) Appl. No.: 10/403,396

(22) Filed: Mar. 31, 2003

(65) Prior Publication Data

US 2004/0202155 A1   Oct. 14, 2004

(51) Int. Cl.
*H04L 12/26* (2006.01)
(52) U.S. Cl. ..................... 370/235; 370/252
(58) Field of Classification Search .......... 370/235, 370/453, 404, 405, 522, 410, 457, 236, 252, 370/468; 709/233, 251, 237, 227, 249
See application file for complete search history.

(56) References Cited

U.S. PATENT DOCUMENTS

| | | | | |
|---|---|---|---|---|
| 5,610,745 | A | | 3/1997 | Bennett ..................... 359/139 |
| 5,638,518 | A | | 6/1997 | Malladi ................. 395/200.21 |
| 5,781,533 | A | * | 7/1998 | Manning et al. ............ 370/236 |
| 6,014,383 | A | * | 1/2000 | McCarty ..................... 370/453 |
| 6,289,386 | B1 | | 9/2001 | Vangemert |
| 6,356,944 | B1 | * | 3/2002 | McCarty ..................... 709/222 |
| 6,393,489 | B1 | | 5/2002 | Sambamurthy et al. ..... 709/250 |
| 6,779,083 | B1 | | 8/2004 | Ito et al. |
| 2002/0133629 | A1 | * | 9/2002 | Jones et al. .................. 709/249 |
| 2003/0016683 | A1 | * | 1/2003 | Georger et al. |
| 2003/0091037 | A1 | | 5/2003 | Latif et al. ................... 370/355 |
| 2003/0126344 | A1 | * | 7/2003 | Hodapp, Jr. |
| 2004/0017771 | A1 | * | 1/2004 | Martin et al. ............... 370/229 |

FOREIGN PATENT DOCUMENTS

WO    WO 01/43328    6/2001

OTHER PUBLICATIONS

Fibre Channel Switch Fabric (FX-SW) Rev. 3.3:, NCITS Working Draft Proposed American National Standard for Information Technology, Oct. 21, 1997.
"Fibre Channel Switch Fabric—2 (FC-SW-2) Rev. 5.3" NCITS Working Draft Proposed American National Standard for Information Technology, Jun. 26, 1001.
"Fibre Channel Framing and Signaling (FC-FS),Rev. 1.70", NCITS Working Draft Proposed American National Standard for Information Technology, Feb. 8, 2002.

* cited by examiner

*Primary Examiner*—Hassan Kizou
*Assistant Examiner*—Hong Sol Cho
(74) *Attorney, Agent, or Firm*—Aka Chan LLP

(57) ABSTRACT

The Fibre-Channel flow control mechanism is augmented to facilitate efficient data exchange between Fibre-Channel ports over extended distances. A supplemental buffer mechanism may be maintained as part of an interface to a transport network used to carry Fibre-Channel traffic. The transport network interface makes a remote Fibre-Channel port aware of the augmented local receiver buffer capacity by intercepting certain frames used in link establishment and substituting an enhanced buffer capacity for the local Fibre-Channel port's internal buffer capacity. This technique provides improved throughput and readily accommodates large distances and large frame sizes.

16 Claims, 3 Drawing Sheets

APPARATUS AND METHOD FOR DISTANCE EXTENSION OF FIBRE-CHANNEL OVER TRANSPORT

STATEMENT OF RELATED APPLICATIONS

The present invention is related to the subject matter of U.S. patent application Ser. No. 10/166,213, entitled "INTELLIGENT FLOW CONTROL MANAGEMENT TO EXTEND FIBRE-CHANNEL LINK FULL PERFORMANCE RANGE," filed on Jun. 10, 2002, the contents of which are herein incorporated by reference for all purposes in their entirety.

The present invention is related to the subject matter of U.S. patent application Ser. No. 10/366,867, entitled "FIBRE-CHANNEL OVER-SUBSCRIPTION OVER DWDM/SONET/SDH OPTICAL TRANSPORT SYSTEMS," filed on Feb. 13, 2003, the contents of which are herein incorporated by reference for all purposes in their entirety.

The present invention is related to the subject matter of U.S. patent application Ser. No. 10/305,640, entitled "MULTIPROTOCOL ENCAPSULATION SYSTEM AND METHOD," filed on Nov. 27, 2002, the contents of which are herein incorporated by reference for all purposes in their entirety.

The present invention is related to the subject matter of the co-filed U.S. patent application Ser. No. 10/403,896, entitled "APPARATUS AND METHOD FOR ENABLING INTELLIGENT FIBRE-CHANNEL CONNECTIVITY OVER TRANSPORT," filed on Mar. 31, 2003 the contents of which are herein incorporated by reference for all purposes in their entirety.

BACKGROUND OF THE INVENTION

The present invention relates to data networking, telecommunication networking, and, in one embodiment, to systems and methods for extending the useful range of Fibre-Channel links.

The Fibre-Channel standard defines a bi-directional link protocol, used to connect computers to disk drives and other peripherals. A typical Fibre-Channel link may have a bandwidth of 1063 Mbps and a span of up to 10 kilometers.

One typical application of Fibre-Channel is interconnecting computer CPUs with arrays of disk drive in large scale computing centers, as would be used in, e.g., financial transaction processing. For reasons of fault tolerance, it is desirable to locate redundant storage resources at remote locations. The advent of high data rate metropolitan optical networks including such networks based on the use of dense wave division multiplexing (DWDM) and/or SONET/SDH transport systems makes it possible to extend so-called storage area networks (SANs) that carry multiple Fibre-Channel links over distances much longer than 10 kilometers.

It is useful to apply the widely prevalent Fibre-Channel standard to communicate across DWDM networks and therefore minimize the need to redesign computing center equipment. Such DWDM networks can themselves employ protocol such as Gigabit Ethernet, 10 Gigabit Ethernet, SONET, etc. A problem arises, however, in that most Fibre-Channel devices available now assume link distances of no more than 10 kilometers while it is desirable to locate SAN nodes much further apart, e.g., hundreds of kilometers.

The Fibre-Channel standard defines a flow control scheme that maximizes data throughput while preventing the transmitter from sending more data than the receiver is currently able to process. For the most prevalent classes of Fibre-Channel devices, the standard utilizes a buffer-to-buffer credit management scheme. When a link is set up, the two ends exchange information about the size of their receiver buffers. The remote receiver buffer size becomes an initial credit value that is decremented after every frame transmission. The remote Fibre-Channel port sends a ready signal indication after each received frame but only if sufficient buffer space has been cleared to accommodate the largest possible frame of new data. The transmitting port increments its credit value in response to the received ready signal indication. New frames are transmitted only when the credit value is positive. This scheme works well over relatively short distances but breaks down over larger distances because of the long delay between sending a frame and receiving a ready indication in response.

U.S. patent application Ser. No. 10/166,213 (not admitted as prior art) discloses a supplemental flow control scheme to facilitate Fibre-Channel operation over longer distances through, e.g., a SONET/SDH transport network. Each port terminating a Fibre-Channel link is connected to the transport network via a transport network interface. The transport network interface operates a supplemental buffer at the transport network egress to augment the capacity of the local Fibre-Channel port's buffer. To exploit the extra buffer capacity, a locally generated ready indication substitutes for the remotely generated ready indication provided by the Fibre-Channel standard. The locally generated ready indication is provided sooner than the remotely generated one so transmission can continue even though the remote ready response is delayed by the long propagation time. The supplemental buffer assures that the local Fibre-Channel port internal buffer will not be overrun.

It is not always desirable to locally generate ready signals. The above-described scheme will not accommodate all Fibre Channel traffic types. Alternative systems and methods for managing flow control in Fibre-Channel links that extend over large distances are needed.

SUMMARY OF THE INVENTION

By virtue of one embodiment of the present invention, the Fibre-Channel flow control mechanism is augmented to facilitate efficient data exchange between Fibre-Channel ports over extended distances. A supplemental buffer mechanism may be maintained as part of an interface to a transport network used to carry Fibre-Channel traffic. The transport network interface makes a remote Fibre-Channel port aware of the augmented local receiver buffer capacity by intercepting certain frames used in link establishment and substituting an enhanced buffer capacity for the local Fibre-Channel port's internal buffer capacity. This technique provides improved throughput and readily accommodates large distances and large frame sizes.

A first aspect of the present invention provides a method for operating a transport network interface to carry Fibre-Channel traffic. The method includes: receiving a login frame from a first Fibre-Channel port, said login frame including a first buffer-to-buffer credit value for use in flow control, substituting a second buffer-to-buffer credit value for said first buffer-to-buffer credit value, and relaying said login frame including said second buffer-to-buffer credit value to a second Fibre-Channel port.

A second aspect of the present invention provides apparatus for operating a transport network interface to relay Fibre-Channel traffic. The apparatus includes an ingress/ egress block that receives a login frame from a first Fibre-Channel port, said login frame including a first buffer-to-buffer credit value for use in flow control, substitutes a second buffer-to-buffer credit value for said first buffer-to-buffer credit value, and relays said login frame including said second buffer-to-buffer credit value to a second Fibre-Channel port. The apparatus also includes a buffer that buffers Fibre-Channel data from said second Fibre-Channel port prior to relaying to said first Fibre-Channel port.

Further understanding of the nature and advantages of the inventions herein may be realized by reference to the remaining portions of the specification and the attached drawings.

DESCRIPTION OF SPECIFIC EMBODIMENTS

The present invention will be described with reference to a representative application in which a Fibre-Channel link is tunneled through a transport network. In one particular implementation, the transport network is implemented as a metropolitan optical network. Fibre-Channel frames are transported through the network encapsulated within packets such as Ethernet packets. Encapsulation details are found in U.S. patent application Ser. No. 10/305,640. Optical network details and the encapsulation details are not germane to the description of the present invention but it will be appreciated that Ethernet packets, e.g., may be carried on optical signals modulated with e.g., 1 Gbps, 2.5 Gbps, or 10 Gbps data waveforms. Also, SONET frames may be used, e.g., instead of Ethernet packets. Multiple optical signals also may share the same fiber by use of wavelength division multiplexing (WDM) techniques.

Figure 1:
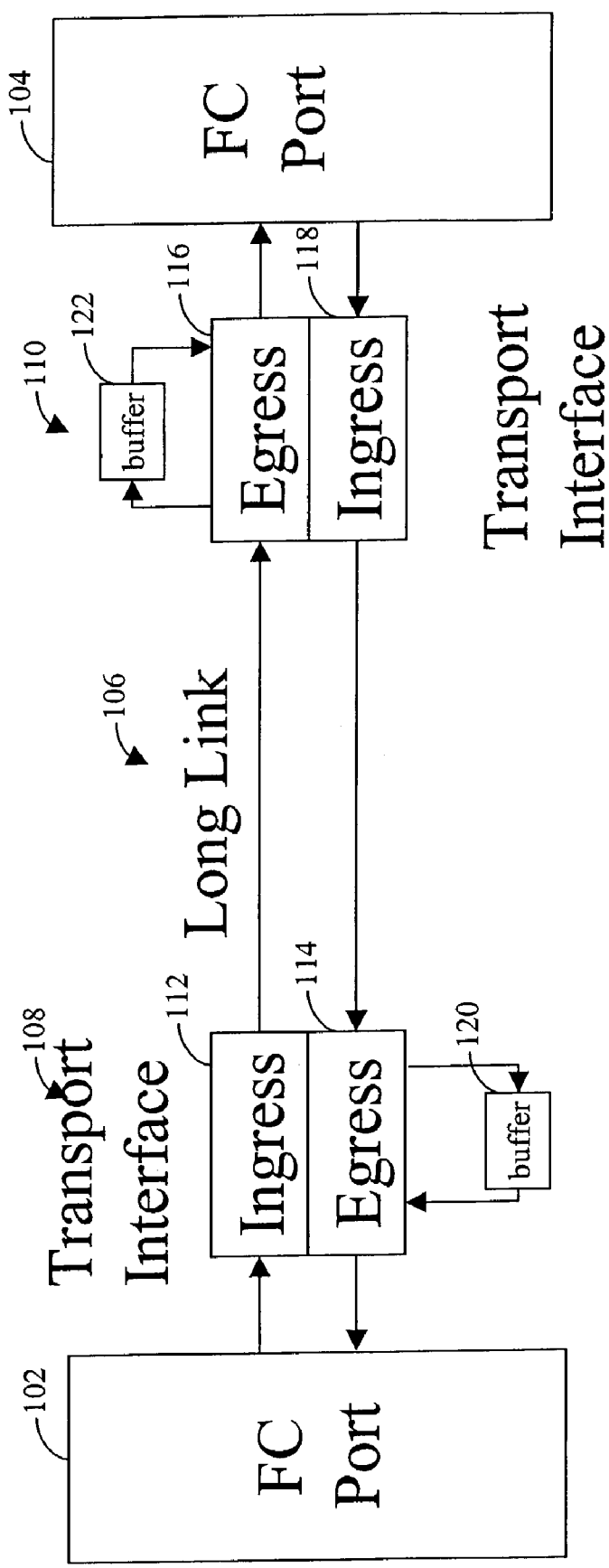
FIG. 1 depicts an enhanced Fibre-Channel link according to one embodiment of the present invention.

FIG. 1 depicts a Fibre-Channel link that is carried through a metropolitan network by use of transport network interfaces according to one embodiment of the present invention. Two Fibre-Channel ports 102 and 104 exchange data in accordance with the Fibre-Channel standard as described in, e.g., "Fibre-Channel Framing and Signaling (FC-FS), Rev 1.70," NCITS Working Draft Proposed American National Standard for Information Technology, Feb. 8, 2002, the contents of which are herein incorporated by reference in their entirety. Fibre-Channel ports 102 and 104 may provide connectivity to devices such as, e.g., disk drives, disk storage arrays, magnetic tape drives, processing units, printers, etc.

A bi-directional link 106 interconnects the Fibre-Channel ports, carrying the Fibre-Channel frames encapsulated within, e.g., Ethernet packets. The link 106 can be either an actual physical link or a tunnel through a network cloud. Transport network interfaces 108 and 110 interface Fibre-Channel ports 102 and 104 to bi-directional link 106. Transport network interface 108 includes an ingress block 112 to encapsulate frames to be transmitted and an egress block 114 to deencapsulate Fibre-Channel frames from received packets. Similarly, transport network interface 110 includes an ingress block 116 and an egress block 118.

According to one embodiment of the present invention, transport network interfaces 108 and 110, in addition to encapsulating and deencapsulating Fibre-Channel frames, also operate a supplemental flow control mechanism to optimize throughput over longer distances. In support of the supplemental flow control mechanism, transport network interfaces 108 and 110 operate supplemental buffers 120 and 122, respectively.

To exploit supplemental buffers 120 and 122 to increase throughput while maintaining appropriate Fibre-Channel flow control, transport network interfaces 108 and 110 modify the initial credit values generated by the local Fibre-Channel port and relayed to the remote Fibre-Channel port when establishing a Fibre-Channel link. The values are modified to take into account the added buffer capacity provided by the supplemental buffers 120 and 122.

Figure 2:
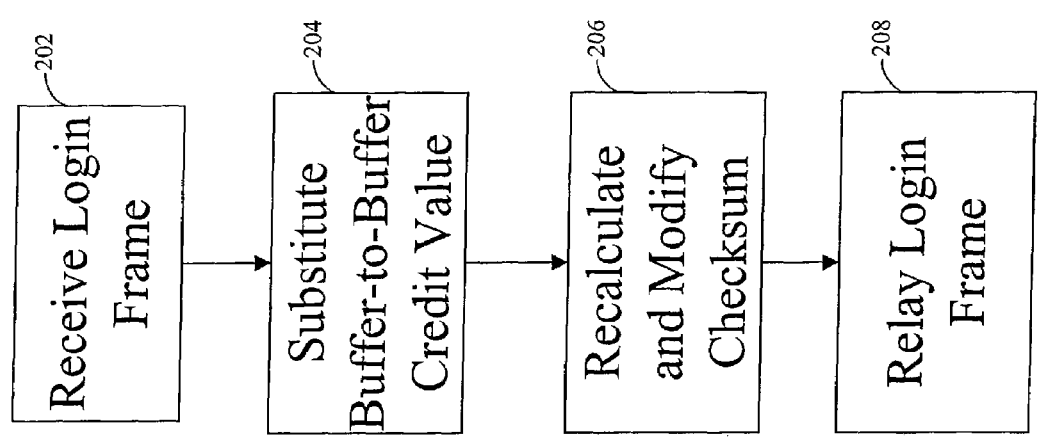
FIG. 2 is a flow chart describing steps of operating a transport network interface in the enhanced Fibre-Channel link of FIG. 1 according to one embodiment of the present invention.

FIG. 2 is a flow chart describing steps of operating a transport network interface to modify the initial buffer-to-buffer credit value in this manner. The flow chart will be described with reference to a transport network interface 110, although it will be understood to apply equally to either transport network interface.

At step 202, ingress block 118 of transport network interface 110 receives a login frame, i.e., one of certain Fibre-Channel frames used in link establishment, from local Fibre-Channel port 104. The login frame may be, e.g., a PLOGI frame, a FLOGI frame, an ELP frame, an ACC frame, etc. The particular frame received will depend on the type of Fibre-Channel device at each end of the link (e.g., switch, node, bridge, etc.) and whether the local port is requesting establishment of the link or responding to such a request.

These frame types all include a field that grants an initial flow control buffer-to-buffer credit value to the remote Fibre-Channel port 102. The credit value typically indicates the size (in frames of maximum size) of a buffer internal to local Fibre-Channel port 104. At step 204, transport network interface 110 modifies this credit value. In one implementation, transport network interface 110 adds the storage capacity (in maximum size frames) of supplemental buffer 122 to the received credit value to obtain the modified credit value. At step 206, transport network interface 110 revises the checksum field of the login frame. The checksum is recalculated to account for the change in the credit value field. At step 208, ingress block 118 relays the modified login frame to remote Fibre-Channel port 102.

In a typical example, local Fibre-Channel port 104 might grant a credit value on the order of 12–20. If Fibre-Channel ports 102 and 104 are separated by hundreds of kilometers, there will be a very large delay between the time Fibre-Channel port 102 transmits a frame and the time it receives a ready signal indication in response. Available credit could easily be exhausted by then, causing a halt in transmissions and a resulting drop in throughput. The operation of the present invention may increase the granted credit value to, e.g., 240, depending on available memory space in supplemental buffer 122. This allows Fibre-Channel port 102 to continue transmitting frames for a significantly longer time while return of the ready signal indication is delayed.

The described implementation can nonetheless guarantee that frames will not be dropped due to buffer overflow. As frames sent from Fibre-Channel port 102 arrive at egress block 116, they are sent to supplemental buffer 122. Supplemental buffer 122 releases frames to local Fibre-Channel port 104. To know when to release frames from supplemental buffer 122, transport network interface 110 monitors credit available from Fibre-Channel port 104. Transport network interface 110 initializes the credit number with the value given in the received login frame, the value replaced at step 204. Thereafter, the credit number is increased every time Fibre-Channel port 104 sends a ready signal indication through ingress block 118 and decreased every time a frame is released from supplemental buffer 122 to Fibre-Channel port 104. Frames are released only when this credit number is positive.

The above description assumes that supplemental buffering is done at the egress. The present invention also encompasses the use of supplemental buffering at the ingress, either alone or in combination with egress buffering. If only ingress buffering is used then the steps of FIG. 2 occur at the transport network interface remote from the credit-granting Fibre-Channel port. Login frames received from across the link are intercepted and modified before forwarding to the local Fibre-Channel port. If both ingress and egress buffering is used, the login frames are intercepted and modified twice with each transport network interface adding its own buffer capacity to the total credit value.

Network Device Details

Figure 3:
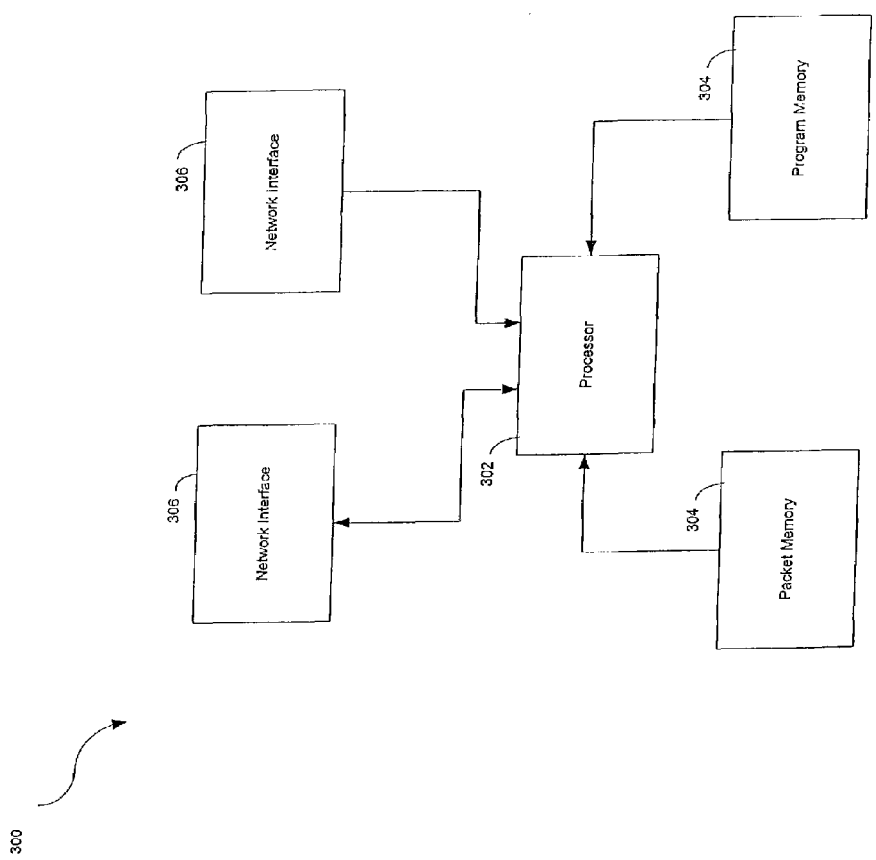
FIG. 3 depicts a network device according to one embodiment of the present invention.

FIG. 3 depicts a network device 300 that may be used to implement, e.g., the transport network interface of FIG. 1 and/or perform any of the steps of FIG. 2. In one embodiment, network device 300 is a programmable machine that may be implemented in hardware, software or any combination thereof. A processor 302 executes code stored in a program memory 304. Processor 302 may perform the encapsulation, de-encapsulation, and flow control operations referred to above. Program memory 304 is one example of a computer-readable storage medium. Program memory 304 can be a volatile memory. Another form of computer-readable storage medium storing the same codes would be some type of non-volatile storage such as floppy disks, CD-ROMs, DVD-ROMs, hard disks, flash memory, etc. A carrier wave that carries the code across a network is another example of a computer-readable storage medium.

Network device 300 interfaces with physical media via a plurality of line cards 306. For example, one of line cards 306 may couple to an optical fiber and may incorporate appropriate physical and link layer functionality. In one implementation, there may be a line card for supporting transport links and another line card for connecting to local Fibre-Channel ports. The line card for supporting transport links may incorporate a Gigabit Ethernet interface, 10-Gigabit Ethernet interface, a SONET interface, etc. As packets are received, processed, and forwarded by network device 300, they may be stored in a packet memory 308. Packet memory 308 may serve to implement buffers such as buffers 120 and 122. Network device 300 implements all of the network protocols and extensions thereof described above as well as the data networking features provided by the present invention.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

The invention claimed is:

1. A method for operating a transport network interface to carry Fibre-Channel traffic, said method comprising:
   receiving a login frame from a remote Fibre-Channel port, said login frame including a first buffer-to-buffer credit value for use in flow control;
   substituting a second buffer-to-buffer credit value for said first buffer-to-buffer credit value;
   relaying said login frame including said second buffer-to-buffer credit value to a local Fibre-Channel port; and
   performing no buffer-to-buffer credit value substitutions for login frames received from said local Fibre Channel port for relay to said remote Fibre Channel port.

2. The method of claim 1 wherein said login frame comprises a PLOGI frame.

3. The method of claim 1 wherein said login frame comprises a FLOGI frame.

4. The method of claim 1 wherein said login frame comprises an ELP frame.

5. The method of claim 1 wherein said login frame comprises an ACC frame.

6. The method of claim 1 wherein said second buffer-to-buffer credit value is greater than said first buffer-to-buffer credit value.

7. The method of claim 6 wherein said second buffer-to-buffer credit value is equal to said first buffer-to-buffer credit value plus a size of a buffer operated by said transport network interface used to buffer Fibre-Channel traffic prior to relaying.

8. Apparatus for operating a transport network interface to relay Fibre-Channel traffic, said apparatus comprising:
   an ingress/egress block that receives a login frame from a remote Fibre-Channel port, said login frame including a first buffer-to-buffer credit value for use in flow control, substitutes a second buffer-to-buffer credit value for said first buffer-to-buffer credit value, decapsulates said login frame from a nonFibre-Channel protocol packet, and relays said decapsulated login frame including said second buffer-to-buffer credit value to a local Fibre-Channel port, and performs no buffer-to-buffer credit value substitutions for login frames received from said local Fibre Channel port for relay to said remote Fibre Channel port; and
   a buffer that buffers Fibre-Channel data from said local Fibre-Channel port prior to relaying to said remote Fibre-Channel port.

9. The apparatus of claim 8 wherein said login frame comprises a PLOGI frame.

10. The apparatus of claim 8 wherein said login frame comprises a FLOGI frame.

11. The apparatus of claim 8 wherein said login frame comprises an ELP frame.

12. The apparatus of claim 8 wherein said login frame comprises an ACC frame.

13. The apparatus of claim 8 wherein said second buffer-to-buffer credit value is greater than said first buffer-to-buffer credit value.

14. The apparatus of claim 13 wherein said second buffer-to-buffer credit value is equal to said first buffer-to-buffer credit value plus a size of said buffer.

15. Apparatus for operating a transport network interface to carry Fibre-Channel traffic, said apparatus comprising:
   means for receiving a login frame from a remote Fibre-Channel port, said login frame including a first buffer-to-buffer credit value for use in flow control;
   means for substituting a second buffer-to-buffer credit value for said first buffer-to-buffer credit value;
   means for relaying said login frame including said second buffer-to-buffer credit value decapsulated from a non-Fibre-Channel protocol packet to a local Fibre-Channel port; and no means for substituting buffer-to-buffer credit values for login frames received from said local Fibre Channel port for relay to said remote Fibre Channel port.

16. A computer program product for operating a transport network interface to carry Fibre-Channel traffic, said computer program product comprising:

code that receives a login frame from a remote Fibre-Channel port, said login frame including a first buffer-to-buffer credit value for use in flow control;

code that substitutes a second buffer-to-buffer credit value for said first buffer-to-buffer credit value;

code that relays said login frame including said second buffer-to-buffer credit value decapsulated from a non-Fibre-Channel protocol packet to a local Fibre-Channel port;

no code for substituting buffer-to-buffer credit values for login frames received from said local Fibre Channel port for relay to said remote Fibre Channel port; and a computer-readable storage medium that stores the codes.

* * * * *